United States Patent
Kravchenko et al.

(10) Patent No.: US 6,471,894 B1
(45) Date of Patent: Oct. 29, 2002

(54) PROCESS AND DEVICE FOR PRODUCING GRANULATED PRODUCTS

(75) Inventors: Iuriy Sergueevich Kravchenko; Anatoliy Andreevich Dolinskiy; Anatoliy Ivanovich Teslia, all of Kiev (UA); Miguel Angel Villarrubia Gonzalez, San Sebastian (ES)

(73) Assignee: Transucrania, S.A., San Sebastian ( * ) Notice: Subject to any disclaimer, the term of this patent is extended or adjusted under 35 U.S.C. 154(b) by 0 days.

(21) Appl. No.: 09/402,638
(22) PCT Filed: Feb. 11, 1998
(86) PCT No.: PCT/ES98/00030
§ 371 (c)(1), (2), (4) Date: Dec. 7, 1999
(87) PCT Pub. No.: WO99/40802
PCT Pub. Date: Aug. 19, 1999

(51) Int. Cl.[7] .................................................. B29B 9/10
(52) U.S. Cl. .............................. 264/9; 264/14; 425/10
(58) Field of Search ..................... 264/9, 14; 425/10; 426/573, 478, 515

(56) References Cited

U.S. PATENT DOCUMENTS

| 3,499,379 A | 3/1970 | Nesmeyanov | 99/234 |
| 3,869,976 A | 3/1975 | Nesmeyanov | 99/484 |
| 4,119,739 A | 10/1978 | Barwick | 426/573 |

FOREIGN PATENT DOCUMENTS

| JP | 59136127 | 8/1970 |
| JP | 62237935 | 10/1987 |
| JP | 63190628 | 8/1988 |
| JP | 03270727 | 12/1991 |
| JP | 4356173 | 12/1992 |

OTHER PUBLICATIONS

English Abstract of Japan JP–63190628–A.
English Abstract of Japan JP–62237935–A.
English Abstract of Japan JP–03270727–A.
English Abstract of JP–59136127–A.
English Abstract of JP–4356173.

*Primary Examiner*—Mary Lynn Theisen
(74) *Attorney, Agent, or Firm*—Ladas & Parry

(57) ABSTRACT

The process comprises forming drops of a liquid to be configured, introducing said drops into a configurator liquid at high temperature in order to produce the coagulation of the drops and to obtain granules; to this effect, the jet of configuration liquid is subjected to the action of periodical pulses which are symmetrical to the axis of the effluent jet of configuration liquid thereby obtaining a controlled disintegration of the liquid into drops. The device for implementing such process includes a pulse chamber (2) with an elastic membrane (4) which produces pressure pulses to the liquid thereby disintegrating the liquid into drops (10) which fall into a receiver (12) and which, together with a configuration liquid flow, are introduced into a column (13) containing the configuration liquid at high temperature. The process and device enable to obtain granulated products such as caviar-like product, granulated meat products, chemical, pharmaceuticals and the like.

5 Claims, 1 Drawing Sheet

PROCESS AND DEVICE FOR PRODUCING GRANULATED PRODUCTS

OBJECT OF THE INVENTION

The invention relates to a procedure that has the object of obtaining granulated products from a liquid emulsion that is submitted to a process of disintegration into droplets, in order to introduce these droplets into a liquid configuring device in which they solidify, thus obtaining the corresponding grains.

It is also the object of the invention to provide a device for putting into practice the aforementioned procedure, the device having means for generating pressure pulses in the liquid to be configured, means by which droplets are obtained with a certain diameter and form, and also a receptor means for the reception of the droplets, by which said droplets are introduced into the configurating liquid.

The principal application of the method and device is found in the food, chemical and pharmaceutical industries, with the object of obtaining granulated products such as black or red granulated caviar substitute, granulated meat, chemical, pharmaceutical products, berry substitutes and others.

BACKGROUND OF THE INVENTION

Methods are known for obtaining granules that are similar to food products such as caviar of sturgeon. A method exists based on the introduction of a viscous or liquid emulsion to be configured into a liquid mass as configuring component, usually hot oil, in such a way that, due to the effect of the temperature, gelling or coagulation of the emulsion to configure occurs, thus producing some granules of a certain consistency. To do this it is necessary to allow the emulsion, prepared and destined to be configured in granular form, to fall dropwise into the mass of the configuring liquid, in such a way that on coming into contact with the liquid coagulation occurs and therefore granules are obtained.

Said type of method has the drawback that the viscous or liquid emulsion to configure, on being in liquid state, does not have enough consistency to maintain its form. Therefore, when the drops fall on the surface of the configuring liquid they are deformed and even get to break with the corresponding loss of form, and so on gelling or coagulating inside the mass of configuring liquid well formed granules are not obtained.

Another drawback consists in the fact that it is very complicated to obtain liquid drops in a continuous fashion with the same diameter and at a rhythm of production sufficiently high to allow industrial exploitation.

In the patent of invention 9700772 a procedure is described for obtained a granulated product whose characteristics imitate the caviar of sturgeon. The procedure is based on the ingredients that are going to form the final product, in the correct proportion and in the way of carrying out the preparation, including equally the phase of final formation of granules by mixing the ingredients is submitted to some pulses that make the liquid mass divide into droplets. These droplets are then straight away introduced into the configuring medium. In said procedure neither way in which the pulses are effected on the liquid mass of the component to be configured nor the media used are specified.

DESCRIPTION OF THE INVENTION

The procedure that is advocated allows the aforementioned problems to be solved. The procedure is based on the disintegration into droplets of the liquid to be configured, to which end said liquid is submitted to the action of periodic pulses, that are symmetric to the axis of the flowing jet of liquid to be configured, in order to avoid deformation of the droplets themselves and, as a consequence, a controlled disintegration is achieved.

The droplets obtained in the disintegration are introduced into the mass of liquid to be configured, with the peculiarity that this introduction is carried out simultaneously with the supply of a flow of configuring liquid, with the speeds of both liquid components being matched, to avoid the droplets of the liquid to be configured from colliding with the surface of the configuring liquid.

In said procedure there is a synchronised control between the stream of periodic pulses that exercise pressure on the jet of liquid to configure, and the speed with which the droplets are introduced into the configuring liquid.

Therefore, by means of the procedure of the invention what is done, in a controlled fashion, is the disintegration of droplets of the liquid jet to configure, along with a visual control synchronised with the speed of introduction of said droplets into the configuring liquid. All this is carried out with a view to avoiding deformations of the repeated droplets and to obtaining granules with uniform morphological characteristics, in accordance with the type of granule that is desired.

The device for putting into practice said procedure includes a chamber which supplies the liquid to configure, and in whose chamber an elastic membrane has been placed which is made to vibrate according to electrical signals with a certain frequency and form. The mechanical pulses of vibrations of the membrane generate pressure pulses in the liquid to configure, all this in order to achieve the disintegration of the liquid jet into droplets, with a control of the sequence of pulses in order to obtain droplets with a determined diameter and form.

The device also includes stroboscopic means for controlling the process of disintegration of the jet of liquid to be configured, a means of control that would have a validation of light impulses synchronised with the sequence of pulses from the elastic membrane.

The device also have a receiver element for the droplets obtained by the method described above, a receiver that, having the form of two convergent cascades, not only receives liquid drops to be configured, but also a flow of configuring liquid, in such a way that the form of this receiver element allows the speeds of the configuring liquid and the liquid to be configured to be matched, avoiding collision of the drops against the configuring liquid and, as a consequence, deformation is prevented.

The introduction of liquid drops to be configured in the mass of configuring liquid is carried out on a column containing this latter component, in such a way that the end of the receiver element by which the drops are fed along with a flow of the configuring liquid, is slightly submerged in the configuring liquid contained in the column, assuring a gradual introduction of the droplets into the column.

DESCRIPTION OF THE DRAWINGS

In order to complete the description that is being given, and with a view to providing a better understanding of the characteristics of the invention, in accordance with an example of an embodiment thereof, this specification is accompanied as an integral part thereof, by a single sheet of drawing in which, by way of illustration and not limiting and in the only FIGURE, a device for putting into practice the procedure for obtaining granulated products of the invention has been represented schematically.

PREFERRED EMBODIMENT OF THE INVENTION

Figure 1:
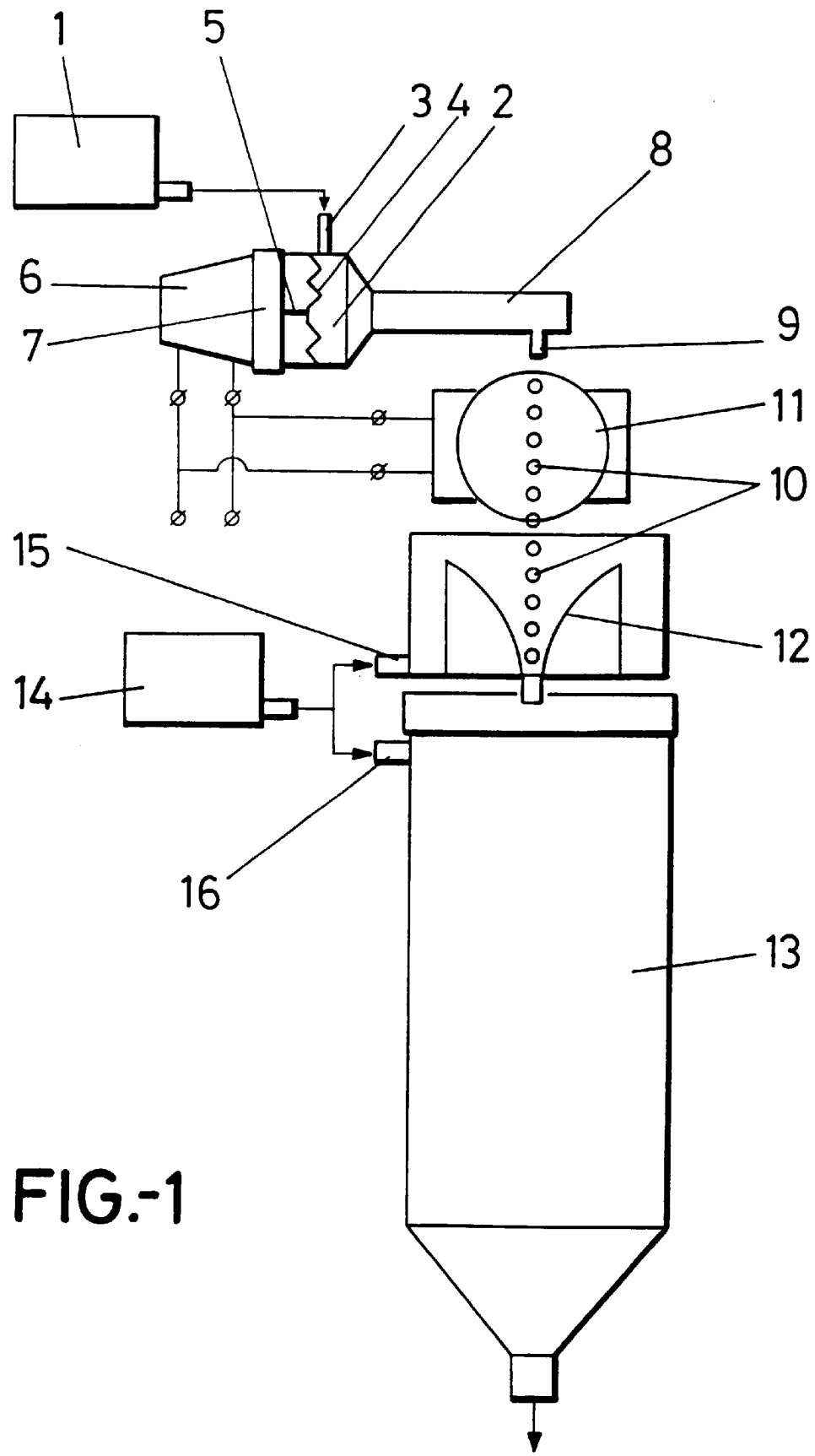

The procedure by which the granulated products are obtained, by disintegration induced by pressure pulses on the liquid to be configured, is carried out by means of the device represented in the figure. First of all, the device includes a reservoir (1) for the liquid to be configured. The reservoir (1) is connected to a chamber (2) which has access to the liquid by a channel (3). The chamber (2) is equipped with an elastic membrane (4) associated with an piston (5) that is moved by a vibrator (6), via a coupling (7). The vibrator (6) generated movements that are transmitted to the elastic membrane itself (4), which, in turn, transmits pulses to the liquid to be configured. The liquid reaches a dispersing device (8) with an outlet or doser (9), in such a way that the liquid to be configured will exit via the doser (9) with a variable speed. This produces symmetrical deformation of the jet and its disintegration into droplets (10) of equal diameter. The diameter depends on the sequence an intensity of the pulses, the diameter of the jet of liquid to be configured and the outlet speed.

The device also includes a impulse lamp (11) that is synchronised in frequency with speed of vibration of the elastic membrane (4), thus allowing the formation of droplets to be observed and their dimensions to be regulated.

The droplets (10) obtained arrive at a receiver (12) located prior to the column (13) of the configuring liquid. The receiver element (12) has the form of two convergent cascades by which a flow of configuring liquid arrives from the reservoir (14) via the channel (15), as the channel (16) is connected to the column (13), in such a way that the flow of configuring liquid that arrives via the channel (15) at the receiver (12), enters simultaneously with the droplets (10), thus achieving a matching of the speeds of the droplets of the liquid to be configured and the flow of configuring liquid, so that both components enter the column (13) at the same time and collisions against the configuring liquid surface are avoided.

With the method and device described, and depending on the compositions of the configuring liquid and the liquid to be configured, it is possible to obtain large-scale production of granulated products of all types, such as caviar of sturgeon, caviar of mintay, red currants, among others, for example.

Below, allusion is made to two examples of obtaining different granulated products, using the procedure and device of the invention.

EXAMPLE 1

An emulsion is prepared consisting of egg, fish meat, methylcellulose, colorants, salt and preservatives, which supplied to the pulse chamber (2), thus obtaining droplets of an emulsion that allowed to fall via the receiver element (12), onto the column (13), that is full of oil heated to a temperature lying between 75° C. and 95° C. The granules obtained have organoleptic characteristics very similar to those of caviar.

EXAMPLE 2

A solution consisting of egg, saccharose, methylcellulose, citric acid, red colorant and red currant aroma is introduced into the pulse chamber (2), producing a coagulation of the droplets obtained within the column (13) containing an oil at 80° C. The granules obtained correspond to a product that imitates red currants.

What is claimed is:

1. A procedure for forming a granulated product from droplets of a liquid emulsion comprising the steps of:

forming said droplets from a jet of said emulsion having periodic pressure pulses acting symmetrically on said jet so as to cause said jet to disintegrate into droplets having a predetermined diameter and form;

introducing said droplets onto a flowing high temperature liquid mass, said high temperature mass producing gelling and coagulation of the drops into granules, said pressure pulses being matched with the speed of said flowing liquid so as to avoid collisions of the droplets of emulsion with the surface of the liquid mass.

2. A device for forming a granulated product flowing from droplets of an emulsion comprising:

a pulse chamber having an emulsion input, an elastic membrane and a dispenser, said membrane providing pulses in a jet of emulsion exiting said dispenser, so that said pulses cause a disintegration of said jet of emulsion into droplets;

a receiver element having two convergent cascades; and a mass of liquid flowing through a column below said receiver, said cascades having an outlet submerged in said mass of liquid.

3. The device of claim 2 further comprising a vibrator having a piston connected to provide said pulses to said membrane.

4. The device of claim 2 further comprising a channel adapted to supply flowing liquid to an internal surface of said receiver element, said flowing liquid having a speed matched to the speed of the droplets and to the speed of the flowing liquid mass in the column so as to avoid collisions of said droplets with the surface of the flowing liquid mass in the column.

5. The device of claim 2 further comprising an impulse lamp synchronized with said pulses of the elastic membrane so as to enable optical inspection of the droplets formed by a doser at an output of said dispenser.

* * * * *